United States Patent
Ise et al.

(10) Patent No.: US 9,776,542 B1
(45) Date of Patent: Oct. 3, 2017

(54) VEHICLE HEATING APPARATUS AND HEATER-EQUIPPED VEHICLE SEAT

(71) Applicant: Panasonic Intellectual Property Management Co., Ltd., Osaka-shi, Osaka (JP)

(72) Inventors: Takehiko Ise, Osaka (JP); Yoshiaki Kurosawa, Osaka (JP); Atsunori Hashimoto, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/605,588

(22) Filed: May 25, 2017

Related U.S. Application Data

(63) Continuation of application No. 14/732,249, filed as application No. PCT/JP2013/007035 on Nov. 29, 2013, now Pat. No. 9,694,728.

(30) Foreign Application Priority Data

Dec. 5, 2012 (JP) ................................ 2012-266642

(51) Int. Cl.
*B60N 2/56* (2006.01)
*B60N 2/44* (2006.01)
*B60H 1/00* (2006.01)

(52) U.S. Cl.
CPC ......... *B60N 2/5657* (2013.01); *B60N 2/5621* (2013.01); *B60N 2/5635* (2013.01);
(Continued)

(58) Field of Classification Search
CPC .. B60N 2/5657; B60N 2/4495; B60N 2/5635; B60N 2/2685
(Continued)

(56) References Cited

U.S. PATENT DOCUMENTS

| 5,102,189 A | 4/1992 | Saito et al. |
| 5,160,517 A * | 11/1992 | Hicks ....................... A61G 5/10 |
| | | 297/180.14 |

(Continued)

FOREIGN PATENT DOCUMENTS

| CN | 1530246 | 9/2004 |
| CN | 2640798 | 9/2004 |

(Continued)

OTHER PUBLICATIONS

International Search Report issued in International Application No. PCT/JP2013/007035, dated Mar. 4, 2014, 2 pages.
Extended European Search Report for corresponding European Patent Application No. 13860810.4, dated Oct. 23, 2015, 7 pages.
(Continued)

*Primary Examiner* — Syed A Islam
(74) *Attorney, Agent, or Firm* — Hamre, Schumann, Mueller & Larson, P.C.

(57) ABSTRACT

A vehicle heating apparatus is a heating apparatus to be mounted on or built in a vehicle seat at a position below a sitting portion of the vehicle seat. The vehicle heating apparatus includes: a housing having an intake port, a blowing port, and an internal space serving as a flow path of air from the intake port to the blowing port; a fan provided in the internal space of the housing; and a heater provided in the internal space of the housing. In a usage state where the vehicle heating apparatus is mounted on or built in the vehicle seat, the blowing port is located above the intake port and opens downwardly with respect to a horizontal direction. Thereby, the amount of heating required for the heater is further reduced.

5 Claims, 19 Drawing Sheets

(52) U.S. Cl.
CPC ......... *B60N 2/5671* (2013.01); *B60N 2/5685* (2013.01); *B60H 2001/00228* (2013.01); *B60N 2/4495* (2013.01)

(58) Field of Classification Search
USPC ...................................... 297/180.11–180.14
See application file for complete search history.

(56) References Cited

U.S. PATENT DOCUMENTS

| | | |
|---|---|---|
| 6,644,735 B2 | 11/2003 | Bargheer et al. |
| 2004/0185766 A1 | 9/2004 | Hayashi et al. |
| 2005/0282486 A1 | 12/2005 | Takeda et al. |
| 2006/0267383 A1 | 11/2006 | Bargheer et al. |
| 2008/0196957 A1 | 8/2008 | Koike et al. |
| 2009/0031742 A1 | 2/2009 | Seo et al. |
| 2011/0278874 A1 | 11/2011 | Lucas |
| 2014/0194049 A1 | 7/2014 | Kumagai et al. |

FOREIGN PATENT DOCUMENTS

| | | |
|---|---|---|
| DE | 10 2009 052683 | 5/2011 |
| JP | 2000-079820 | 3/2000 |
| JP | 2011-254882 | 12/2011 |
| JP | 2012-183154 | 9/2012 |

OTHER PUBLICATIONS

Search Report issued in corresponding Chinese Patent Application, dated May 27, 2016, 3 pages with translation.

\* cited by examiner

VEHICLE HEATING APPARATUS AND HEATER-EQUIPPED VEHICLE SEAT

This is a continuation of International Application No. PCT/JP2013/007035, with an international filing date of Nov. 29, 2013, which claims the foreign priority of Japanese Patent Application No. 2012-266642, filed on Dec. 5, 2012, the entire contents of both of which are hereby incorporated by reference.

BACKGROUND OF THE INVENTION

1. Field of the Invention

The present disclosure relates to a vehicle heating apparatus to be mounted on or built in a vehicle seat. The present disclosure also relates to a heater-equipped vehicle seat including the vehicle heating apparatus.

2. Description of Related Art

As seats for vehicles such as wheeled vehicles, heater-equipped vehicle seats capable of supplying warm air to the lower legs of occupants have been conventionally proposed.

JP 2011-254882 A discloses a heater-equipped vehicle seat 200 in which an air conditioner 210 is disposed within a seat cushion 211B, as shown in FIG. 17. The air conditioner 210 has an intake port 202, an intake duct 204A, an air blower 206, a pair of discharge ducts 204B, a pair of heaters 207, and a pair of discharge ports 203. The heater 207 is disposed within each of the pair of discharge ducts 204B. The intake port 202 and the pair of discharge ports 203 open in a forward direction from the heater-equipped vehicle seat 200, and are arranged side by side in a horizontal direction. In addition, the discharge port 203 is provided with a fin 203A for directing air discharged from the discharge port 203 downwardly.

JP 2012-183154 A discloses a heater-equipped vehicle seat 300 including, as shown in FIG. 18, a seat cushion 311B, a leg rest member 308, an air blower 306, and a duct 304. A portion of the duct 304 is formed in the leg rest member 308. Warm air delivered from the air blower 306 is supplied toward the lower legs of an occupant through the duct 304.

SUMMARY OF THE INVENTION

For the heater-equipped vehicle seats described in JP 2011-254882 A and JP 2012-183154 A, there is room for further improvement in their performance in terms of the amount of heating required for the heaters. One non-limiting and exemplary embodiment of the present disclosure provides a vehicle heating apparatus and a heater-equipped vehicle seat in which the amount of heating required for a heater is further reduced.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

In one general aspect, the techniques disclosed here feature a vehicle heating apparatus to be mounted on or built in a vehicle seat at a position below a sitting portion of the vehicle seat. The vehicle heating apparatus includes: a housing having an intake port, a blowing port, and an internal space serving as a flow path of air from the intake port to the blowing port; a fan provided in the internal space of the housing; and a heater provided in the internal space of the housing. In a usage state where the vehicle heating apparatus is mounted on or built in the vehicle seat, the blowing port is located above the intake port and opens downwardly with respect to a horizontal direction.

These general and specific aspects may be implemented using a system, a method, and a computer program, and any combination of systems, methods, and computer programs.

With the features of the above vehicle heating apparatus, a vehicle heating apparatus in which the amount of heating required for a heater is further reduced can be provided.

DETAILED DESCRIPTION

Figure 1:
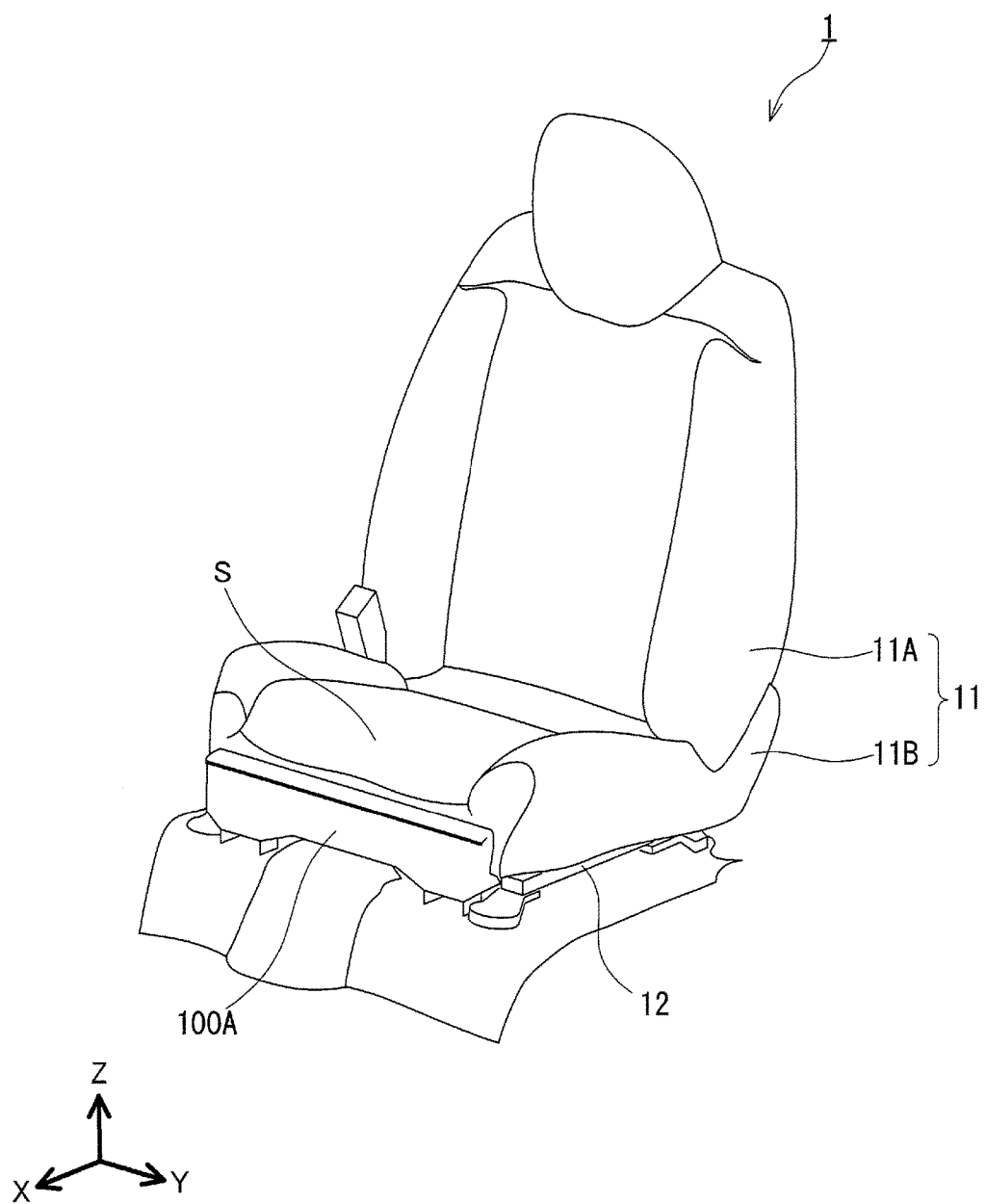
FIG. 1 is a perspective view of a heater-equipped vehicle seat according to a first embodiment of the present disclosure.

According to a heater-equipped vehicle seat 200 of JP 2011-254882 A, air flows as described below are supposed to be produced in the indoor space of the vehicle. First, warm air supplied from the discharge port 203 and directed downwardly by the fin 203A flows downward toward the occupant's feet and slows down on the floor of the vehicle. Upon reaching the floor, the warm air moves upward due to buoyancy and diffuses into the indoor space. Therefore, the warm air is very unlikely to reach the intake port 202. Accordingly, the temperature of the air supplied to the intake port 202 is significantly lower than that of the warm air.

In this case, it is necessary to use the heaters 207 having high heating capacity to maintain the temperature of the warm air discharged from the discharge ports 203 at a predetermined temperature or higher. Therefore, the air conditioner 210 still has room for improvement in its performance to reduce the amount of heating required for the heaters.

A first aspect of the present disclosure provides a vehicle heating apparatus to be mounted on or built in a vehicle seat at a position below a sitting portion of the vehicle seat. The vehicle heating apparatus includes: a housing having an intake port, a blowing port, and an internal space serving as a flow path of air from the intake port to the blowing port; a fan provided in the internal space of the housing; and a heater provided in the internal space of the housing. In a usage state where the vehicle heating apparatus is mounted on or built in the vehicle seat, the blowing port is located above the intake port and opens downwardly with respect to a horizontal direction.

According to the first aspect, the intake port is located below the blowing port. Furthermore, the blowing port opens downwardly with respect to the horizontal direction. Therefore, warm air blown out through the blowing port forms a circulating air flow at the occupant's feet and thus is more likely to reach the intake port. Thus, it is possible to increase the temperature of air drawn into the intake port and to reduce the amount of heating required of the heater.

A second aspect of the present disclosure provides the vehicle heating apparatus according to the first aspect, wherein when the vehicle heating apparatus in the usage state is viewed in plan from a front of the sitting portion, the blowing port and the intake port overlap each other in a width direction. According to the second aspect, the intake port is located in the path of the flow of warm air blown out through the blowing port, and therefore the warm air blown out through the blowing port is more likely to reach the intake port.

A third aspect of the present disclosure provides the vehicle heating apparatus according to the first or second aspect, wherein the fan is located closer to the intake port than the heater is. According to the third aspect, it is possible to reduce the pressure loss of the air flow in the flow path of air between the intake port and the fan.

A fourth aspect of the present disclosure provides the vehicle heating apparatus according to the first or second aspect, wherein the heater is located closer to the intake port than the fan is. According to the fourth aspect, it is possible to increase the flow velocity of warm air blown out through the blowing port, and thus the circulation of the warm air between the blowing port and the intake port is promoted.

A fifth aspect of the present disclosure provides the vehicle heating apparatus according to any one of the first to fourth aspects, wherein in the usage state, the housing has the blowing ports provided at one end and the other end thereof in a width direction. According to the fifth aspect, the blowing ports are each located to face the back of the lower leg of the occupant. Therefore, warm air blown out through each blowing port flows downwardly along the back of the lower leg of the occupant, and thus the warm air blown out through the blowing port is more likely to reach the intake port.

A sixth aspect of the present disclosure provides the vehicle heating apparatus according to the fifth aspect, wherein when the blowing port provided at the one end of the housing is defined as a left blowing port and the blowing port provided at the other end of the housing is defined as a right blowing port, the housing further has a partition portion that separates the left blowing port from the right blowing port in the width direction and prevents blowing of air. According to the sixth aspect, warm air is not blown out of the partition portion between the left blowing port and the right blowing port, and therefore it is possible to increase the amount of warm air blown out through the left blowing port and the right blowing port. In addition, it is possible to suppress a decrease in the amount of warm air reaching the intake port due to the supply of the warm air between the lower left leg and the lower right leg of the occupant.

A seventh aspect of the present disclosure provides the vehicle heating apparatus according to the sixth aspect, wherein the housing has the intake ports provided at the one end and the other end thereof in the width direction, and when the intake port provided at the one end of the housing is defined as a left intake port and the intake port provided at the other end of the housing is defined as a right blowing port and when the vehicle heating apparatus is viewed in plan from a front of the sitting portion, the left intake port is located below the left blowing port and the right intake port is located below the right blowing port. According to the seventh aspect, warm air blown out through the left blowing port is more likely to reach the left intake port, and warm air blown out through the right blowing port is more likely to reach the right intake port. Therefore, the warm air blown out through the blowing ports is more likely to reach the intake ports.

An eighth aspect of the present disclosure provides the vehicle heating apparatus according to the seventh aspect, wherein a width of the left blowing port is greater than a width of the left intake port, and a width of the right blowing port is greater than a width of the right intake port. According to the eighth aspect, it is possible to ensure both the warmth for the calf of the occupant and the efficient drawing of air into the intake port.

A ninth aspect of the present disclosure provides the vehicle heating apparatus according to any one of the sixth to eighth aspects, wherein the flow path includes a left flow path from the left intake port to the left blowing port and a right flow path from the right intake port to the right blowing port, and the heater extends in the width direction so as to heat air flowing in the left flow path and air flowing in the right flow path, or the left flow path and the right flow path each have the heater disposed therein. According to the ninth aspect, it is possible to heat the air flowing in the left flow path and the air flowing in right flow path appropriately. In some cases, it is possible to heat the air in the left flow path and the air in the right flow path separately. For example, it is also possible to intentionally cause warm air to be blown out through the left blowing port and the right blowing port at different temperatures.

A tenth aspect of the present disclosure provides the vehicle heating apparatus according to the ninth aspect, wherein the left flow path and the right flow path each have the heater disposed therein, and one of an amount of heating by the heater in the left flow path and an amount of heating by the heater in the right flow path is greater than the other. According to the tenth aspect, it is possible to cause warm air with a higher temperature to be blown out through the blowing port closer to a window of the vehicle.

An eleventh aspect of the present disclosure provides the vehicle heating apparatus according to any one of the fifth to tenth aspects, wherein in the usage state, the housing further has at least one selected from the group consisting of: (i) a first upward blowing port opening upwardly between the blowing port provided at the one end of the housing and the blowing port provided at the other end of the housing; (ii) second upward blowing ports opening upwardly in the vicinity of both ends of the blowing port provided at the one end of the housing and in the vicinity of both ends of the blowing port provided at the other end of the housing; and (iii) a third upward blowing port that is formed so as to blow air outward in the width direction and obliquely upward. According to the eleventh aspect, it is possible to supply warm air upward or obliquely upward toward the outside of the vehicle heating apparatus in its width direction, and thus to increase the warmth for the occupant.

A twelfth aspect of the present disclosure provides the vehicle heating apparatus according to any one of the first to eleventh aspects, wherein in the usage state, the intake port opens forward or downward. According to the twelfth aspect, warm air blown out through the blowing port is more likely to reach the intake port.

A thirteenth aspect of the present disclosure provides the vehicle heating apparatus according to the twelfth aspect, wherein the housing further has a confining wall that restrains air from being drawn into the intake port from a back or a side of the housing in the usage state. According to the thirteenth aspect, it is possible to restrain relatively low temperature air in the indoor space from being drawn into the intake port from the back or the side of the housing, and thus to reduce the amount of heating required for the heater.

A fourteenth aspect of the present disclosure provides the vehicle heating apparatus according to any one of the first to thirteenth aspects, wherein in the usage state, a normal line to an opening face of the blowing port is inclined downwardly at an angle of 30° to 70° to a horizontal plane. According to the fourteenth aspect, it is possible to achieve both high probability of warm air blown out through the blowing port reaching the intake port and ensuring of warmth for the lower legs of the occupant.

A fifteenth aspect of the present disclosure provides the vehicle heating apparatus according to any one of the first to fourteenth aspects, further including a radiation member that exchanges heat with warm air present between the heater and the blowing port and radiates heat outside the vehicle heating apparatus, wherein in the usage state, the radiation member radiates heat forward. According to the fifteenth aspect, it is possible to increase the warmth for the lower legs of the occupant.

A sixteenth aspect of the present disclosure provides a heater-equipped vehicle seat including: a vehicle seat having a sitting portion; and the vehicle heating apparatus according to any one of the first to fifteenth aspects that is mounted on or built in the vehicle seat at a position below the sitting portion.

Hereinafter, embodiments of the present disclosure will be described with reference to the drawings. The following description relates to exemplary embodiments of the present disclosure, and the present disclosure is not limited to these embodiments. The following description assumes that the vehicle is placed on a horizontal plane.

First Embodiment

As shown in FIG. 1, a heater-equipped vehicle seat 1 includes: a vehicle seat 11 having a back cushion 11A and a seat cushion 11B; and a vehicle heating apparatus 100A. The heater-equipped vehicle seat 1 is attached to a base member 12 provided on the floor of the vehicle. The back cushion 11A supports the back of the occupant. In the seat cushion 11B, a sitting portion S that supports the upper legs of the occupant is formed. The vehicle heating apparatus 100A is mounted on the vehicle seat 11 at a position below the sitting portion S. That is, the heater-equipped vehicle seat 1 includes the vehicle seat 11 having the sitting portion S and the vehicle heating apparatus 100A mounted on the vehicle seat 11 at a position below the sitting portion S. The vehicle heating apparatus 100A is located at the front end of the vehicle seat 11 (in the positive direction of the X axis), and supplies warm air mainly to the lower legs of the occupant. In the accompanying drawings, the XY plane is horizontal. The forward direction with respect to the heater-equipped vehicle seat 1 is defined as the positive direction of the X axis. The width direction of the heater-equipped vehicle seat 1 is defined as the Y direction, and the direction from the right leg of the occupant toward the left leg of the occupant is defined as the positive direction of the Y axis. The vertical direction perpendicular to the XY plane is defined as the Z direction, and the vertically upward direction is defined as the positive direction of the Z axis. In the present specification, "left" and "right" are determined with respect to the occupant seated on the heater-equipped vehicle seat 1.

Figure 2:
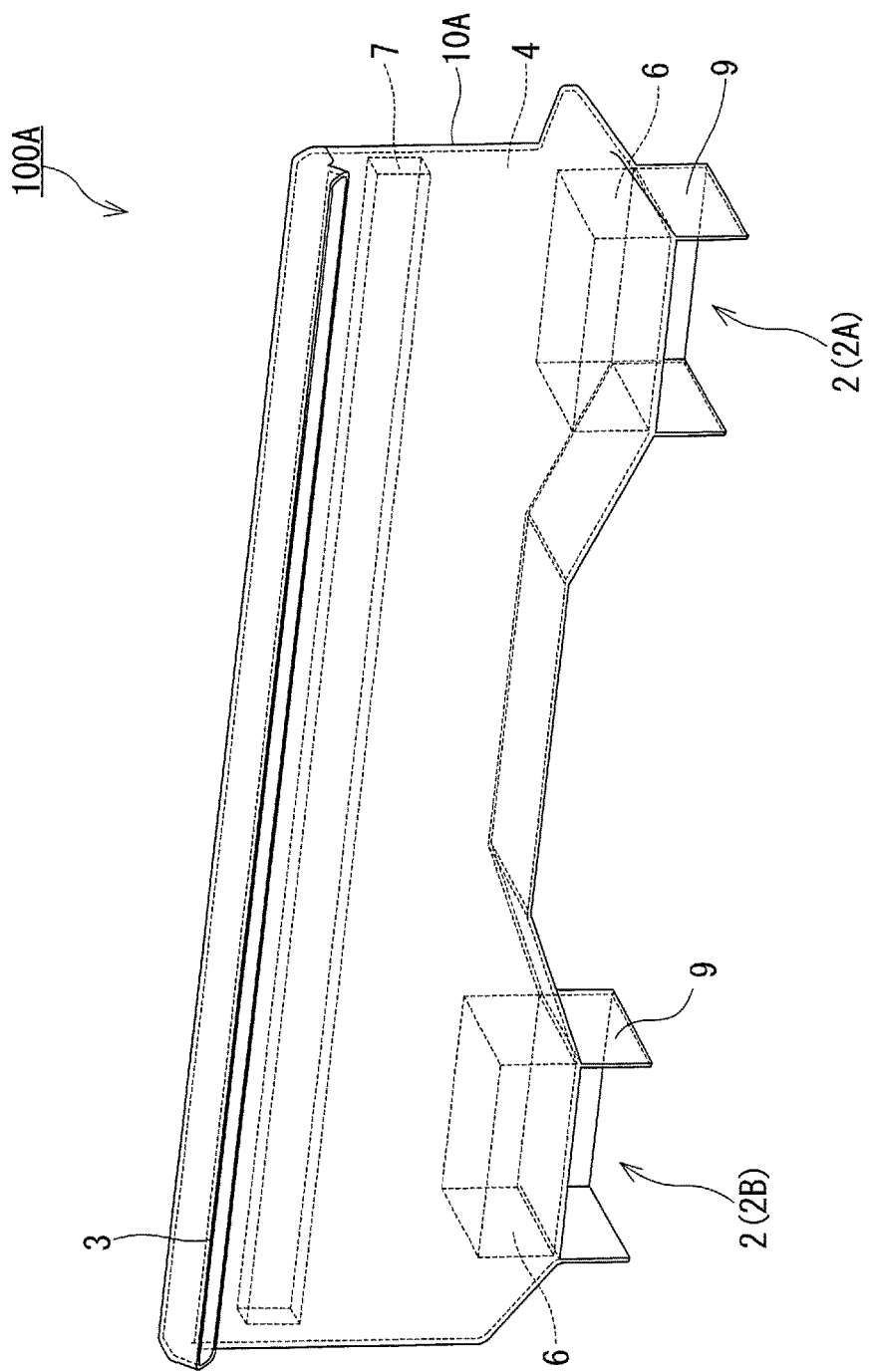
FIG. 2 is a perspective view of a vehicle heating apparatus according to the first embodiment.
Figure 3:
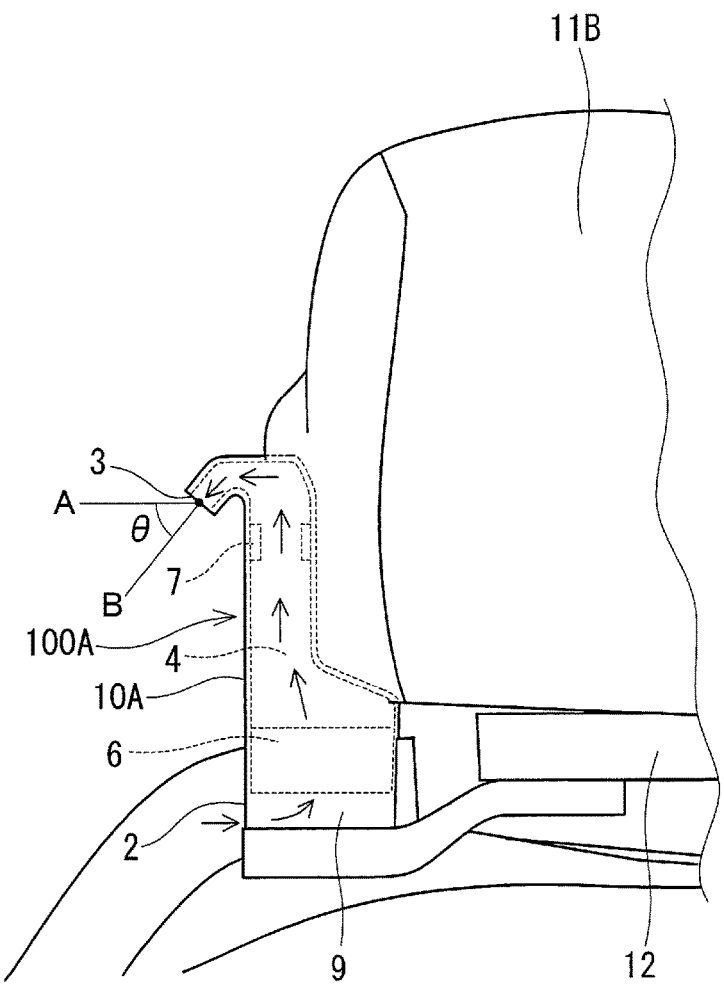
FIG. 3 is a side view showing air flows in the vehicle heating apparatus shown in FIG. 2.

As described above, the vehicle heating apparatus 100A is a heating apparatus to be mounted on the vehicle seat 11 at a position below the sitting portion S of the vehicle seat 11. As shown in FIG. 2, the vehicle heating apparatus 100A includes a housing 10A, fans 6, and a heater 7. The housing 10A has intake ports 2, a blowing port 3, and an internal space 4 serving as a flow path of air from the intake ports 2 to the blowing port 3. The fans 6 and the heater 7 are provided in the internal space 4 of the housing 10A. As shown in FIG. 3, the blowing port 3 is located above the intake ports 2 and opens downwardly with respect to the horizontal direction in a state where the vehicle heating apparatus 100A is mounted on the vehicle seat 11 (referred to as a "usage state" hereinafter). That is, the blowing port 3 opens obliquely downward. In the usage state, the intake ports 2 each open forward or downward. In addition, the housing 10A includes confining walls 9 that restrain air from being drawn into the intake ports 2 from the back or side of the housing 10A in the usage state. The housing 10A is located at the front end of the vehicle seat in the usage state.

As shown in FIG. 3, in the usage state, the flow path 4 extends upwardly from each intake port 2, turns obliquely downward at the upper end of the housing 10A, and extends to the blowing port 3. The housing 10A has a portion bent in a hook shape, in which portion the blowing port 3 is formed. By actuation of the fan 6, air around the intake port 2 is drawn through the intake port 2 and supplied to the internal space 4 (flow path). The air delivered upwardly by the fan 6 is heated by the heater 7 while flowing in the flow path 4. The air heated by the heater 7 (warm air) is blown out of the housing 10A through the blowing port 3. In the present embodiment, the fan 6 is located closer to the intake port 2 than the heater 7 is. That is, according to the present embodiment, the heater 7 is not situated upstream of the fan 6 in the flow path 4. With such a configuration, the pressure loss of the air flow upstream of the fan 6 in the flow path 4 is reduced, and therefore a decrease in suction force of the fan 6 can be limited. In addition, since the heater 7 is located downstream of the fan 6 in the flow path 4, the length of the flow path 4 between the heater 7 and the blowing port 3 is relatively short. Therefore, the heat loss of the air heated by the heater 7 is reduced. Furthermore, since the air blown by the fan 6 always passes through the heater 7, it is possible to reduce non-uniformity of flow velocity distribution of the warm air blown out through the blowing port 3. The fan 6 may be provided adjacent to the intake port 2, as shown in FIG. 2.

The heater 7 may be located closer to the intake port 2 than the fan 6 is. With such a configuration, the distance between the fan 6 and the blowing port 3 is relatively short, and therefore the flow velocity of warm air blown out through the blowing port 3 can be increased. As a result, the circulation of the warm air between the blowing port 3 and the intake port 2 is promoted.

Figure 4:
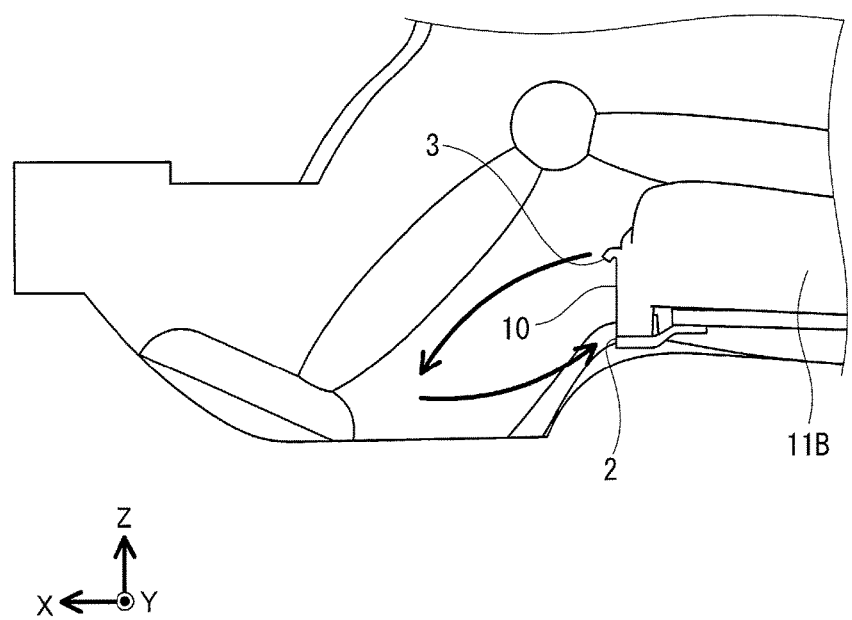
FIG. 4 is a side view conceptually showing air flows produced by the vehicle heating apparatus shown in FIG. 2.

As shown in FIG. 4, warm air blown to the outside thorough the blowing port 3 flows downwardly along the lower legs of the occupant and reaches the floor of the vehicle. Upon reaching the floor of the vehicle, the warm air is pushed by the subsequent warm air blown out through the blowing port 3, flows upwardly and backwardly, and reaches the vicinity of the intake ports 2. Some of the warm air having reached the vicinity of the intake ports 2 is drawn into the intake ports 2 and supplied to the flow path inside the housing 10A. That is, the warm air blown out through the blowing port 3 forms a circulating air flow at the occupant' feet and thus is more likely to reach the intake ports 2. Therefore, the temperature of the air drawn through the intake ports 2 can be increased, and the amount of heating required for the heater 7 can be reduced. Thus, the vehicle heating apparatus 100A requires less electricity to heat the vehicle.

An axial-flow fan or a centrifugal fan can be used as the fan 6. The amount of air delivered by the fan 6 is not particularly limited. For example, it is recommended that the air flow have a flow velocity of 0.4 to 2.0 m/sec immediately after being delivered by the fan 6. In this case, the circulating flow of warm air as described above is more likely to be formed. The heater 7 is, for example, an electric heater such as a PTC (Positive Temperature Coefficient) heater or a ceramic heater. In this case, the heater 7 generates heat by receiving electricity supplied from a power supply (not shown), and heats the air flowing in the flow path 4. The output power of the heater 7 is not particularly limited, and is, for example, 50 to 300 W. The heater 7 may be a hot-water heater or the like that performs heating using a coolant having exchanged heat with a heat source (e.g., a water-cooled engine) external to the vehicle heating apparatus 100A.

As shown in FIG. 2, in the upper end portion of the housing 10A, the blowing port 3 extends continuously in the width direction. Two intake ports 2 are formed at the lower end portion of the housing 10A. When the vehicle heating apparatus 100A in the usage state is viewed in plan from the front of the sitting portion S, the blowing port 3 and the intake ports 2 overlap each other in the width direction. That is, when the intake ports 2 are shifted in parallel in the vertical direction in a plan view where the vehicle heating apparatus 100A is viewed in plan from the front, the intake ports 2 overlap the blowing port 3. With such a positional relationship, the warm air blown out through the blowing port 3 downwardly is more likely to reach the intake ports 2. Accordingly, the circulation of warm air between the blowing port 3 and the intake ports 2 is promoted. These two intake ports 2 include a left intake port 2A located at one end (the left end) of the housing 10A and a right intake port 2B located at the other end (the right end) of the housing 10A. Therefore, the left intake port 2A is more likely to face the back of the left lower leg of the occupant, and the right intake port 2B is more likely to face the back of the right lower leg of the occupant. As a result, the warm air is more likely to flow along the back of the lower leg of the occupant and to reach the left intake port 2A or the right intake port 2B. Accordingly, the circulation of warm air between the blowing port 3 and the intake ports 2 is promoted.

In the present embodiment, the heater 7 extends in the width direction so as to be located directly above the left intake port 2A and the right intake port 2B. Therefore, both the air drawn through the left intake port 2A and the air drawn through the right intake port 2B are sufficiently heated by the heater 7.

In the usage state, as shown in FIG. 3, the normal line B to the opening face of the blowing port 3 is inclined downwardly at an angle (blowing angle) $\theta$ to the horizontal plane A. The blowing angle $\theta$ is not particularly limited as long as it is more than 0° and less than 90°. The blowing angle $\theta$ is, for example, in the range of 30° to 70°. With the blowing angle $\theta$ being in this range, warm air blown out through the blowing port is more likely to flow along the lower legs of the occupant and is also more likely to reach the intake ports 2. Therefore, both high probability of warm air reaching the intake ports 2 and ensuring of warmth for the lower legs of the occupant are more reliably achieved. In order to enhance this effect, the blowing angle $\theta$ is desirably in the range of 35° to 60°, and more desirably in the range of 40° to 50°.

Second Embodiment

Next, a vehicle heating apparatus 100B according to a second embodiment of the present disclosure will be described. Unless otherwise described, the second embodiment is configured in the same manner as the first embodiment. The components of the second embodiment that are the same as or correspond to those of the first embodiment are denoted by the same reference characters as used in the first embodiment, and the detailed description of such components may be omitted. That is, the descriptions given for the first embodiment can apply to the present embodiment unless being technically inconsistent. This is also true for the embodiments and modifications described later.

Figure 5:
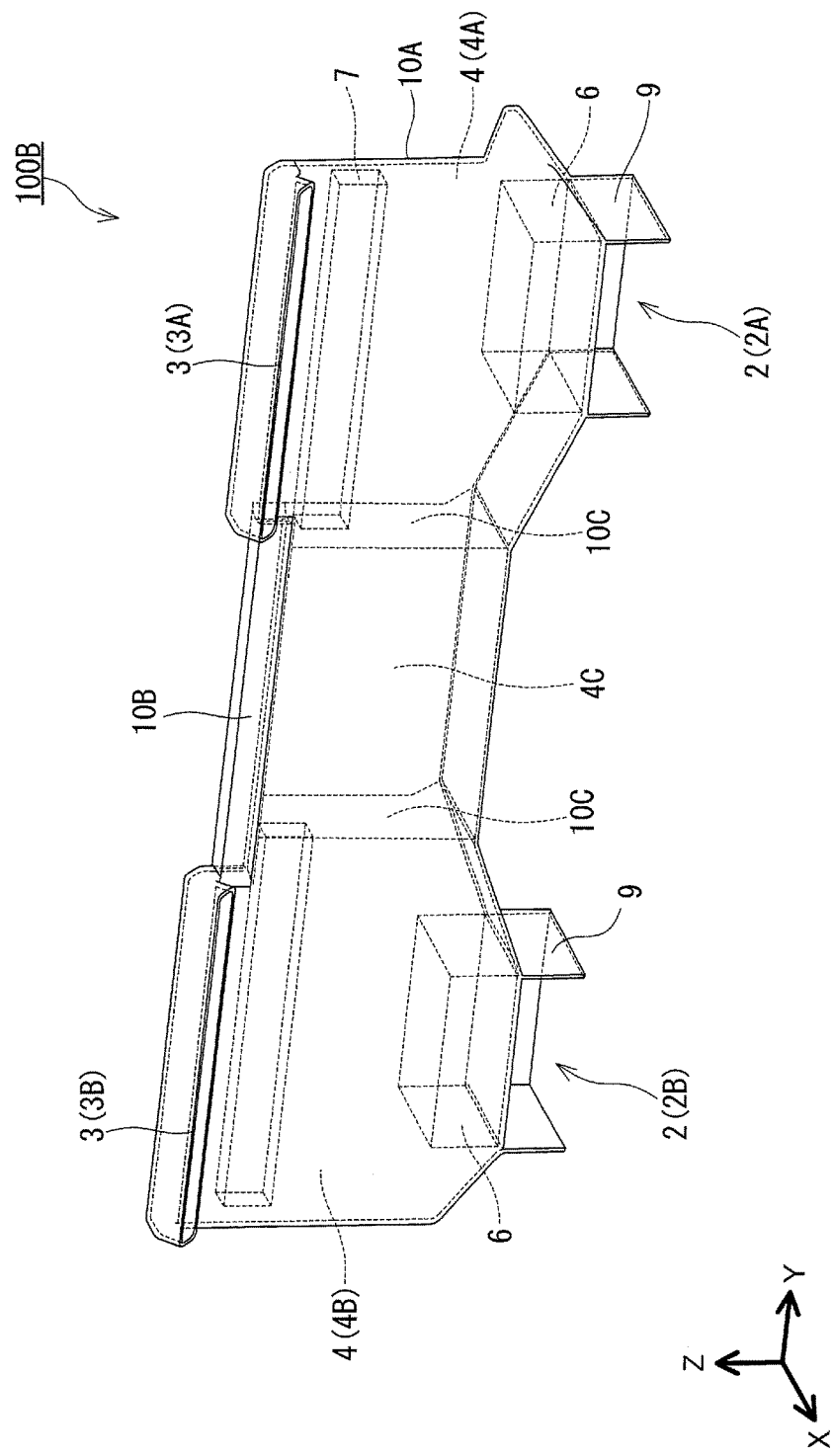
FIG. 5 is a perspective view of a vehicle heating apparatus according to a second embodiment of the present disclosure.

In FIG. 5, the width direction (Y direction) of the housing 10A coincides with the width direction (Y direction) of the vehicle sheet 11 in the usage state. In the present embodiment, as shown in FIG. 5, in the usage state, the housing 10A has the blowing ports 3 at one end (the left end) and the other end (the right end) thereof in the width direction. The blowing port 3 provided at one end (the left end) of the housing 10A is defined as a left blowing port 3A, and the blowing port 3 provided at the other end (the right end) of the housing 10A is defined as a right blowing port 3B. The left blowing port 3A faces the left lower leg of the occupant, and the right blowing port 3B faces the right lower leg of the occupant. Therefore, the warm air blown out through the left blowing port 3A or the right blowing port 3B is more likely to flow along the lower leg of the occupant. As a result, the warm air is more likely to reach the intake ports 2.

In the present embodiment, the housing 10A further has a partition portion 10B that separates the left blowing port 3A from the right blowing port 3B in the width direction and prevents blowing of air. Thus, the warm air is not blown out of the partition portion 10B between the left blowing port 3A and the right blowing port 3B, and therefore the flow velocity of the warm air blown out through the left blowing port 3A or the right blowing port 3B can be increased. Alternatively, in the case where the warm air is blown out through the left blowing port 3A or the right blowing port 3B at about the same flow velocity as that of the warm air blown out through the blowing port 3 of the vehicle heating apparatus 100A in the first embodiment, the size, the rotational speed, etc. required for the fan 6 can be reduced. In addition, the supply of the warm air between the lower left leg and the lower right leg of the occupant is limited, and therefore the amount of warm air reaching the intake ports 2 is less likely to decrease.

In the present embodiment, the housing 10A has the intake ports 2 at one end (the left end) and the other end (the right end) thereof in the width direction. The intake port 2 provided at one end (the left end) of the housing 10A is defined as a left intake port 2A, and the intake port 2 provided at the other end (the right end) of the housing 10A is defined as a right intake port 2B. When the vehicle heating apparatus 100B of the present embodiment is viewed in plan from the front of the sitting portion S, the left intake port 2A is located below the left blowing port 3A and the right intake port 2B is located below the right blowing port 3B. Therefore, the warm air blown out through the left blowing port 3A is more likely to reach the left intake port 2A, and the warm air blown out through the right blowing port 3B is more likely to reach the right intake port 2B. As a result, the whole warm air blown out through the blowing ports 3 is more likely to reach the intake ports 2.

Specifically, the left intake port 2A is located directly below the left blowing port 3A, and the right intake port 2B is located directly below the right blowing port 3B. The width of the left blowing port 3A is greater than the width of the left intake port 2A, and the width of the right blowing port 3B is greater than the width of the right intake port 2B. The ratio of the width W2 of the left blowing port 3A to the width W1 of the left intake port 2A (W2/W1) is, for example, in the range of 1.2 to 10. This applies to the right intake port 2B and the right blowing port 3B. In the width direction, the left intake port 2A is located entirely within the width of the left blowing port 3A, and the right intake port 2B is located entirely within the width of the right blowing port 3B. With such a configuration, not only the above-described effects can be obtained more satisfactorily, but also the effects as described below can be obtained. The blowing ports 3 each are required to have a certain width since it is necessary to warm the calf of the occupant. By contrast, it is desirable that the area of the opening of the intake port 2 be small in order to increase the flow velocity of air in the vicinity of the intake port 2 in the flow path 4 and thus to efficiently draw air through the intake port 2. When the ratio (W2/W1) is in the above range, it is possible to achieve both the warmth for the calf of the occupant and the efficient drawing of air through the intake port 2.

In the present embodiment, as shown in FIG. 5, the flow path 4 of air in the internal space of the housing 10A includes a left flow path 4A from the left intake port 2A to the left blowing port 3A and a right flow path 4B from the right intake port 2B to the right blowing port 3B. In the internal space of the housing 10A, a central space 4C is formed by partition walls 10C between the left flow path 4A and the right flow path 4B. The left flow path 4A and the right flow path 4B each have the heater 7 disposed therein. Therefore, the length of each heater 7 in the width direction can be reduced and thus the amount of heating required for the heater 7 can be limited. The left flow path 4A and the right flow path 4B each have the fan 6 disposed therein. The central space 4C may be used as a space to place a thermostat (not shown) for controlling the amount of heating by the heater 7 in the left flow path 4A and the heater 7 in the right flow path 4B, a controller (not shown) for the fans 6, etc.

With the above-described configuration, air in the left flow path 4A and air in the right flow path 4B can be heated separately. It is also possible, in some cases, to intentionally cause warm air to be blown out through the left blowing port 3A and the right blowing port 3B at different temperatures. For example, one of the amount of heating by the heater 7 in the left flow path 4A and the amount of heating by the heater 7 in the right flow path 4B may be greater than the other. With such a configuration, it is possible to further increase the amount of heating by the heater provided in one of the flow paths closer to the window of the vehicle so as to blow higher-temperature warm air out through the blowing port closer to the window of the vehicle, and therefore the influence of cold air in the vicinity of the window of the vehicle can be reduced. As a result, the sensory balance of the warmth for the occupant is achieved. In this case, one of the amount of air delivered by the fan 6 in the left flow path 4A and the amount of air delivered by the fan in the right flow path 4B may be larger than the other. With such a configuration, it is possible to further increase the amount of air delivered by the fan provided in one of the flow paths closer to the window of the vehicle so as to blow warm air out through the blowing port closer to the window of the vehicle at a higher flow velocity, and therefore the influence of cold air in the vicinity of the window of the vehicle can be reduced.

Due to the positional relationship between the left intake port 2A and the right intake port 2B in the indoor space of the vehicle, the temperature of air drawn through the left intake port 2A may differ significantly from that of air drawn through the right intake port 2B. In this case, the above-described configuration makes it is possible to make the amount of heating by the heater 7 provided in one of the left flow path 4A and the right flow path 4B greater than the amount of heating by the heater 7 provided in the other flow path in order to balance the temperature of warm air blown through the left blowing port 3A and the temperature of warm air blown through the right blowing port 3B. There is no need to provide the partition walls 10C in the internal space of the housing 10A. One heater 7 may extends continuously in the width direction so as to heat the air flowing in the left flow path 4A and the air flowing in the right flow path 4B. Furthermore, the housing 10A may be configured to have two separate and independent housings, one forming the left flow path 4A and the other forming the right flow path 4B. That is, the housing 10A formed of two independent left and right portions may be mounted on the vehicle seat 11.

Third Embodiment

Figure 6:
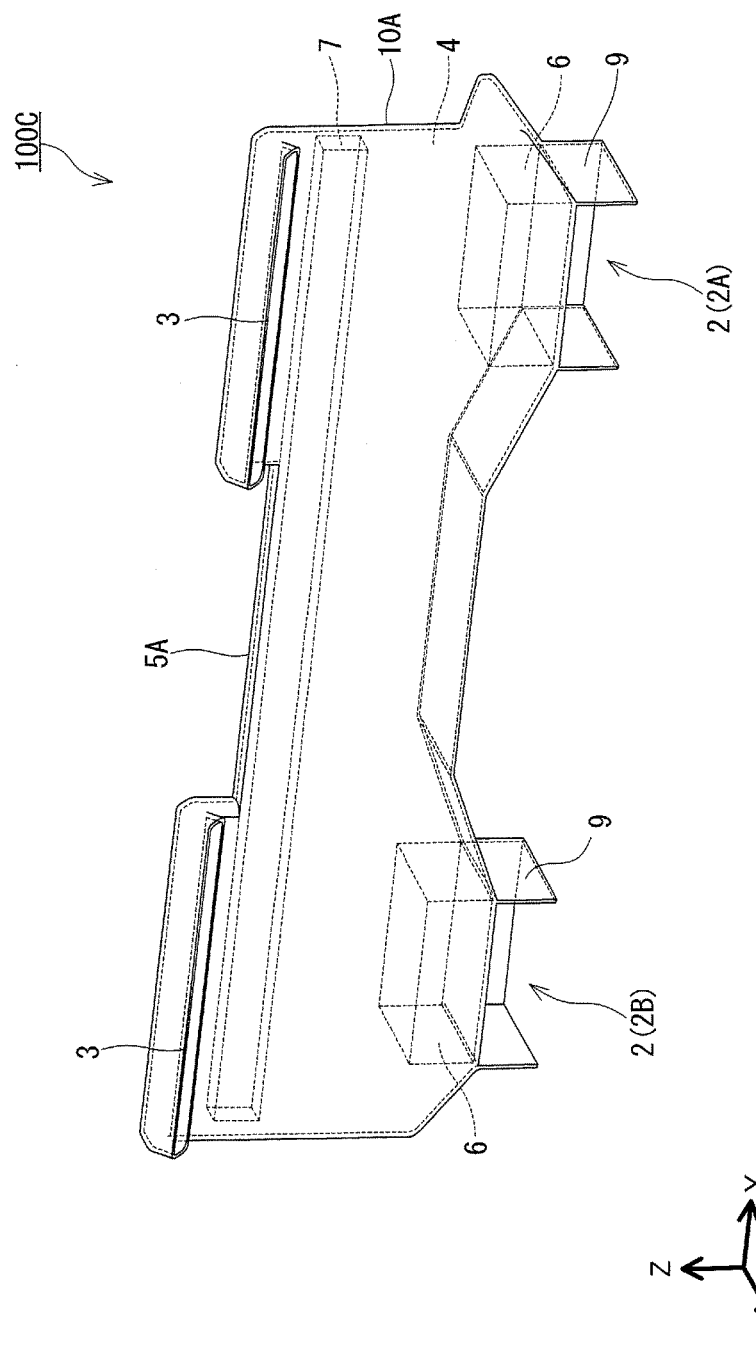
FIG. 6 is a perspective view of a vehicle heating apparatus according to a third embodiment of the present disclosure.

Next, a vehicle heating apparatus 100C according to a third embodiment will be described. As shown in FIG. 6, the housing 10A has the blowing ports 3 at one end and the other end thereof in the width direction. The housing 10A also has a first upward blowing port 5A at the upper end portion of the housing 10A. The first upward blowing port 5A extends in the width direction between the blowing port 3 provided at one end of the housing 10A and the blowing port 3 provided at the other end thereof and opens upwardly therebetween. The heater 7 extends continuously from one end portion to the other end portion in the width direction of the internal space of the housing 10A.

Figure 7:
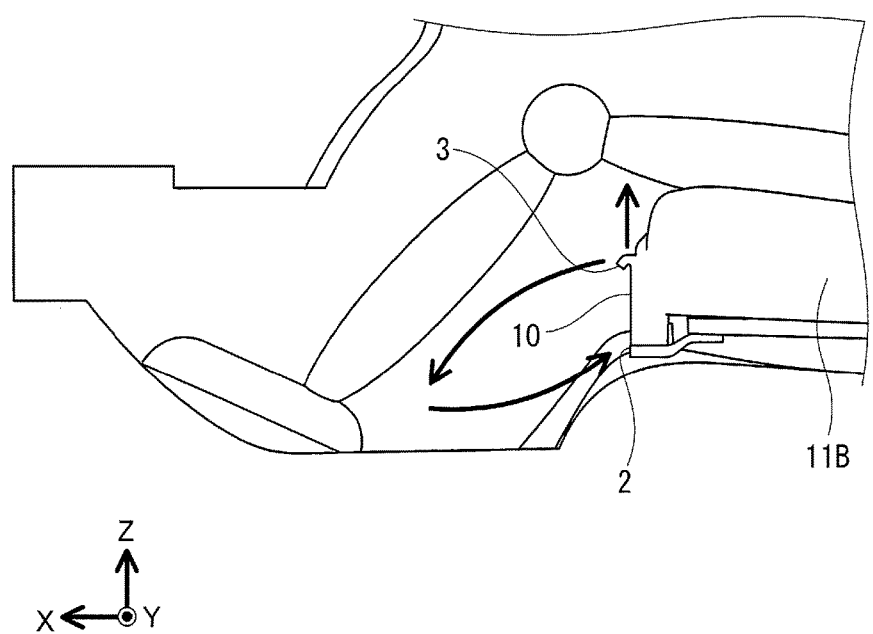
FIG. 7 is a side view conceptually showing air flows produced by the vehicle heating apparatus shown in FIG. 6.

Some of the warm air drawn through the intake ports 2 and heated by the heater 7 is blown upward through the first upward blowing port 5A. Therefore, in the present embodiment, the flows of the warm air as shown in FIG. 7 are formed. According to the present embodiment, an upward flow of warm air is formed in addition to the flows of warm air circulating between the blowing ports 3 and the intake ports 2. As a result, the warmth for the occupant can be increased.

Fourth Embodiment

Figure 8:
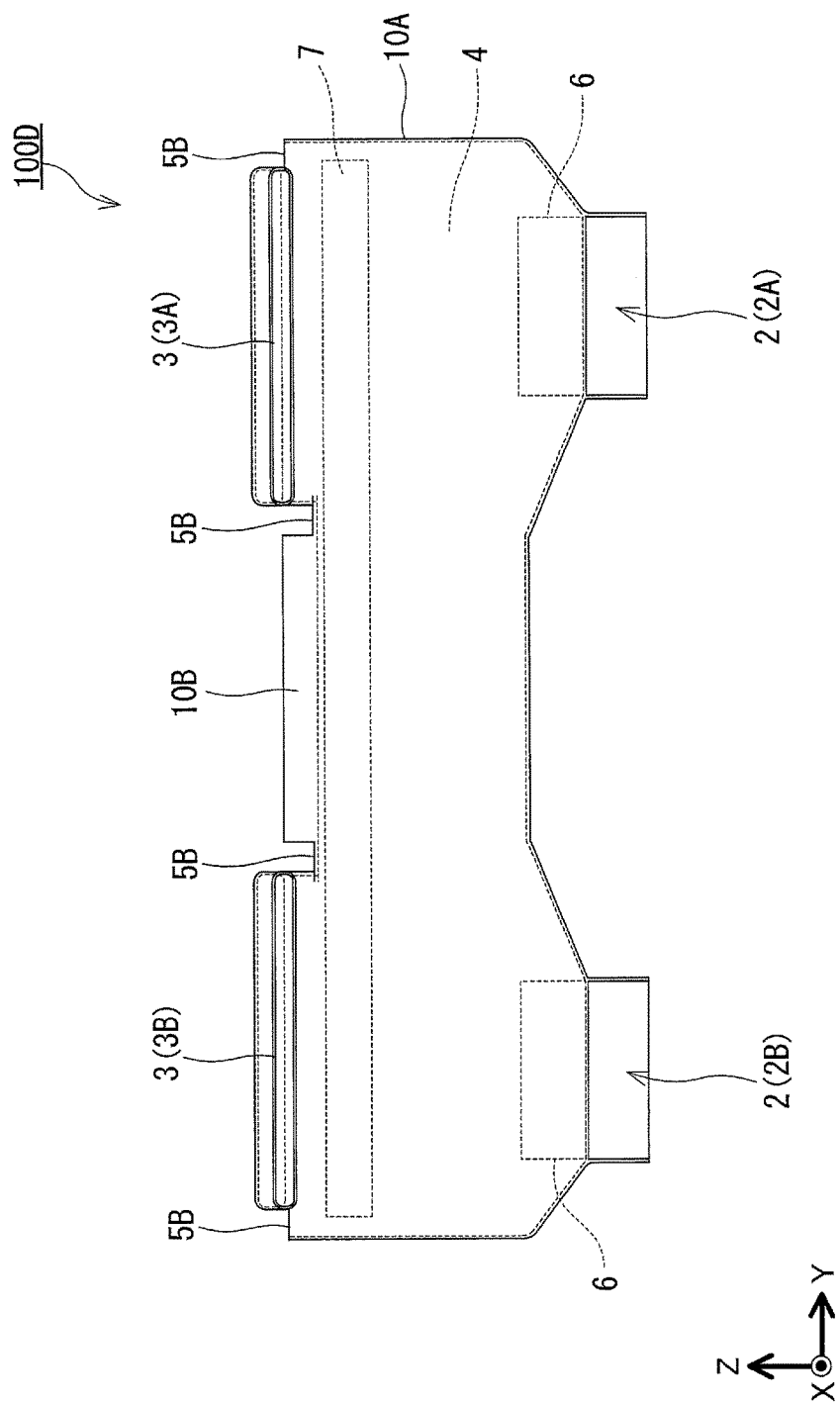
FIG. 8 is a front view of a vehicle heating apparatus according to a fourth embodiment of the present disclosure.

Next, a vehicle heating apparatus 100D according to a fourth embodiment will be described. As shown in FIG. 8, the housing 10A has the blowing ports 3 at one end and the other end thereof in the width direction. The housing 10A further has a plurality of second upward blowing ports 5B opening upwardly. The second upward blowing ports 5B open upwardly in the vicinity of both ends of the blowing port 3 provided at one end of the housing 10A and in the vicinity of both ends of the blowing port 3 provided at the other end of the housing 10A. That is, the blowing port 3 provided at one end of the housing 10A is interposed between the pair of second upward blowing ports 5B. The blowing port 3 provided at the other end of the housing 10A is interposed between the pair of second upward blowing ports 5B. The housing 10A further has a partition portion 10B between the two second upward blowing ports 5B located closer to the center of the width direction. The heater 7 extends continuously from one end portion to the other end portion in the width direction of the internal space of the housing 10A.

Figure 9:
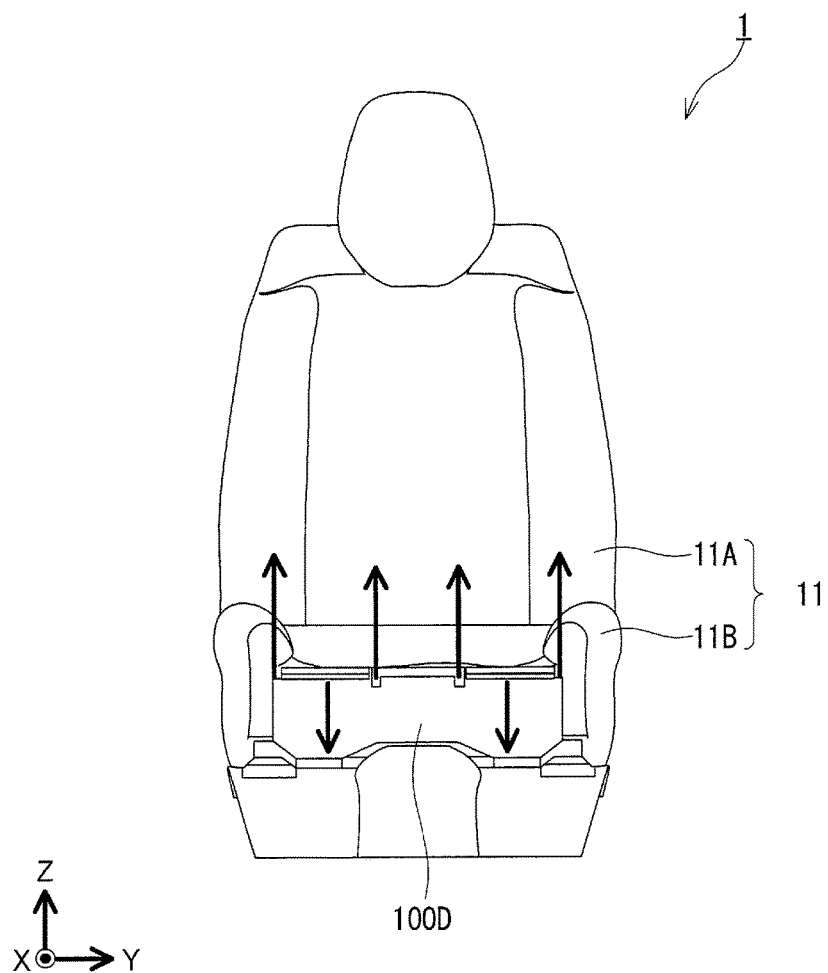
FIG. 9 is a front view conceptually showing air flows produced by the vehicle heating apparatus shown in FIG. 8.

According to the present embodiment, as shown in FIG. 9, warm air is not only blown out downwardly through each blowing port 3 but also blown out upwardly through the blowing ports 5B in the vicinity of both ends of the blowing port 3. Thereby, warm air is blown out so as to encompass the upper legs of the occupant, due to which the warmth for the occupant can be increased. In addition, the amount of warm air blown out upwardly is limited by the partition portion 10B, and therefore it is possible to suppress a decrease in the amount of warm air reaching the intake ports 2.

Fifth Embodiment

Figure 10:
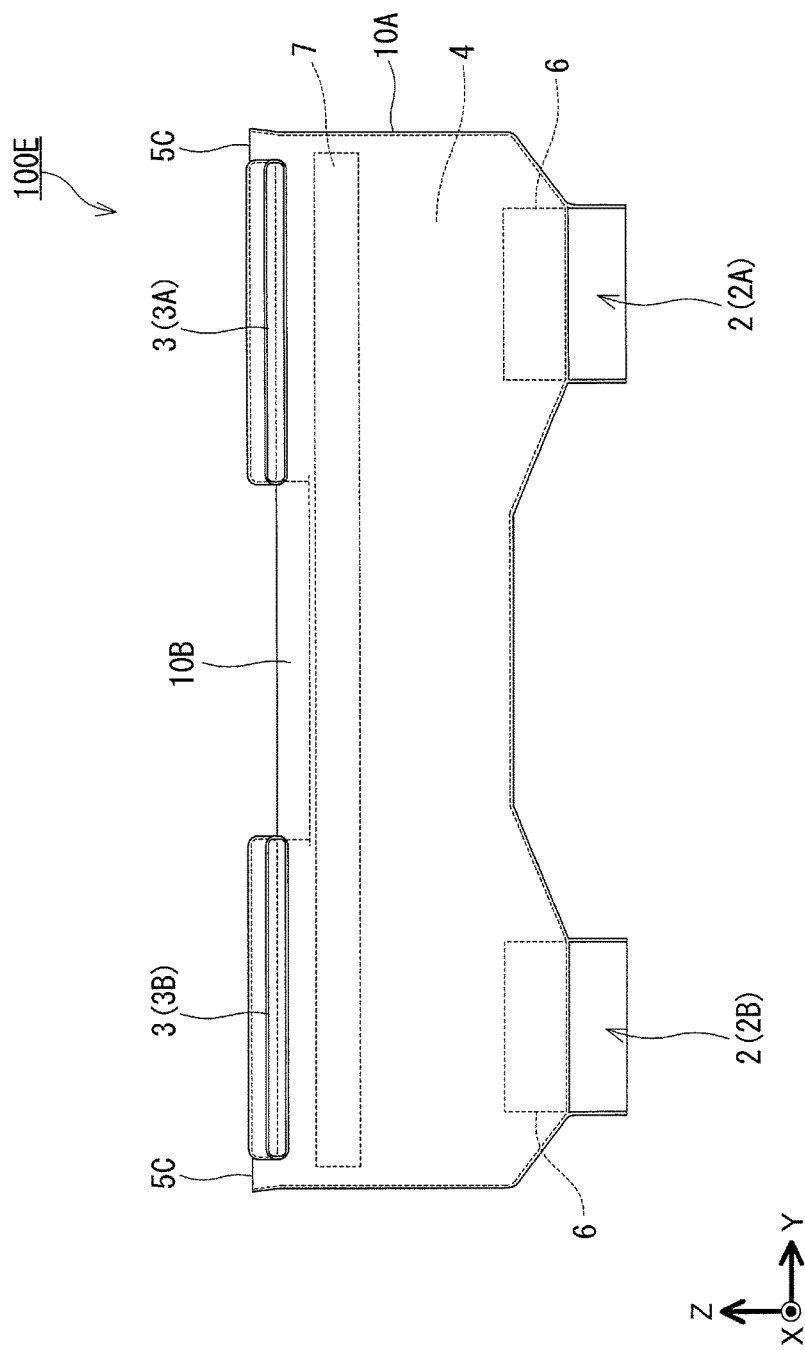
FIG. 10 is a front view of a vehicle heating apparatus according to a fifth embodiment of the present disclosure.
Figure 11:
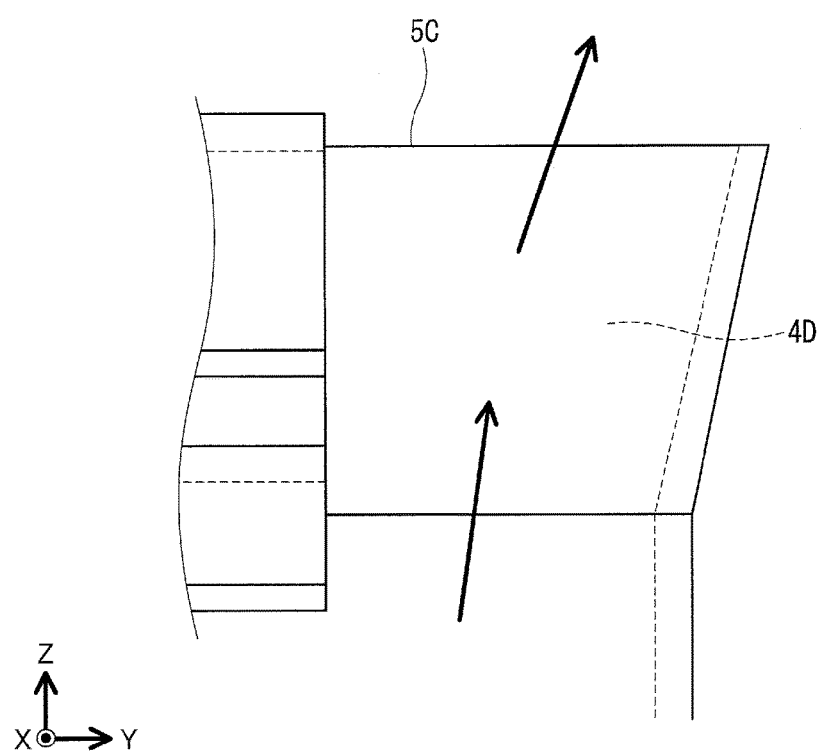
FIG. 11 is an enlarged front view of the key portion of the vehicle heating apparatus shown in FIG. 10.
Figure 12:
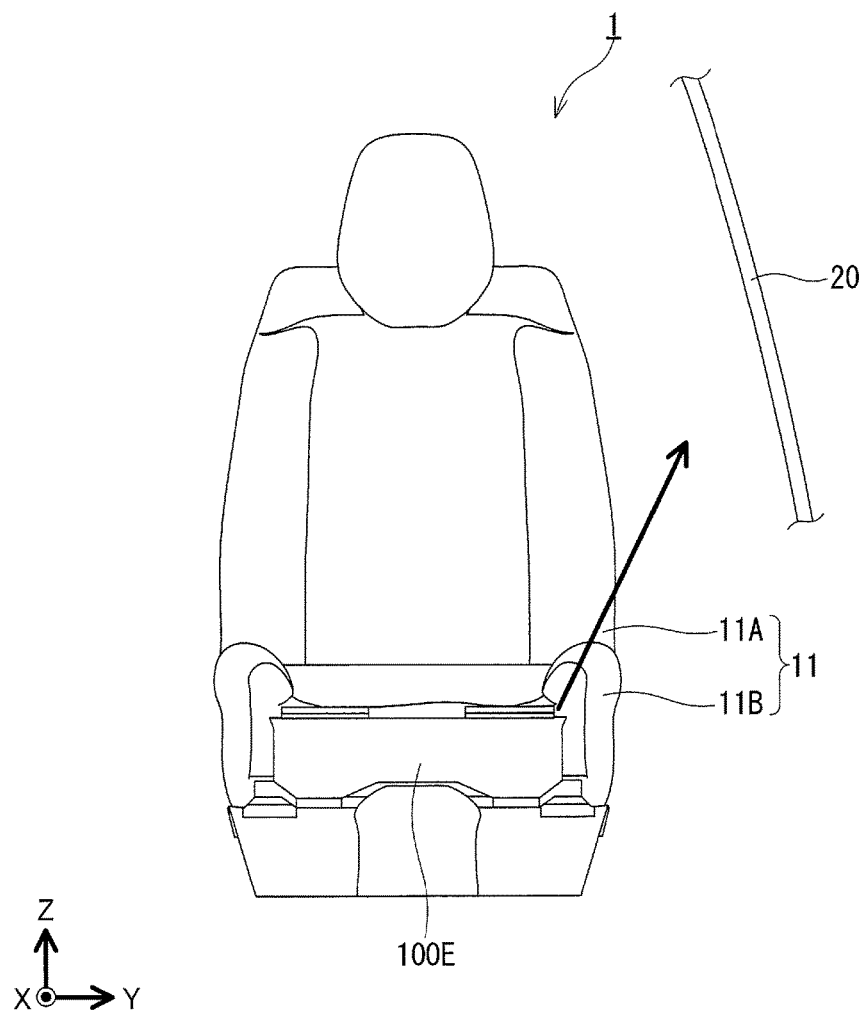
FIG. 12 is a front view conceptually showing an air flow produced around the vehicle heating apparatus shown in FIG. 10.

Next, a vehicle heating apparatus 100E according to a fifth embodiment will be described. As shown in FIG. 10, the housing 10A has the blowing ports 3 at one end and the other end thereof in the width direction. The housing 10A further has a third upward blowing port 5C that is formed so as to blow air outward in the width direction and obliquely upward. Specifically, the third upward blowing port 5C opens upwardly at a position corresponding to one of the ends of the housing (the third upward blowing ports open upwardly at positions corresponding to both ends of the housing in FIG. 10) in the width direction and to the upper end of a flow path 4D having a cross section that increases upward and outward in the width direction. In the present embodiment, the third upward blowing port 5C is located outside the blowing port 3 in the width direction. The heater 7 extends continuously from one end portion to the other end portion in the width direction of the internal space of the housing 10A. As shown in FIG. 11, some of the warm air drawn through the intake port 2 and heated by the heater 7 is blown outward in the width direction and obliquely upward through the third upward blowing port 5C. It is often the case that the heater-equipped vehicle seat 1 is located adjacent to a window 20 of the vehicle that separates the indoor space of the vehicle from the outside atmosphere, as shown in FIG. 12. With the above-described configuration, warm air is blown out toward the window 20 through the third upward blowing port 5C. Therefore, the window 20 can be warmed by the warm air, and therefore the radiation of cool air from the window 20 can be reduced. As a result, the warmth for the occupant can be increased.

The housing 10A may be configured by an arbitrary combination of the above-described third to fifth embodiments. In other words, in the usage state, the housing 10A may have at least one selected from the group consisting of the first upward blowing port 5A, the second upward blowing ports 5B, and the third upward blowing port 5C.

<Modifications>

Figure 13A:
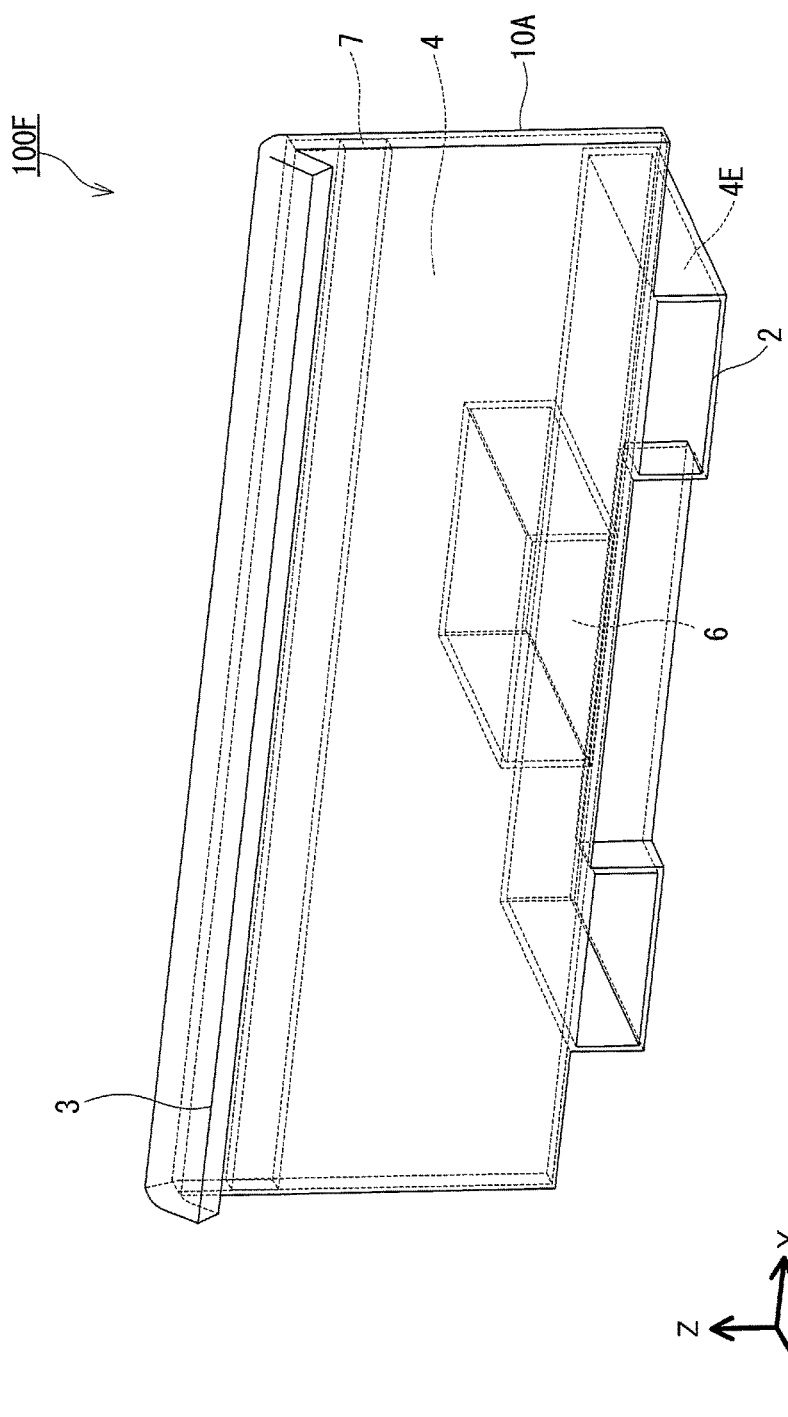
FIG. 13A is a perspective view of a vehicle heating apparatus according to a modification of the present disclosure.
Figure 13B:
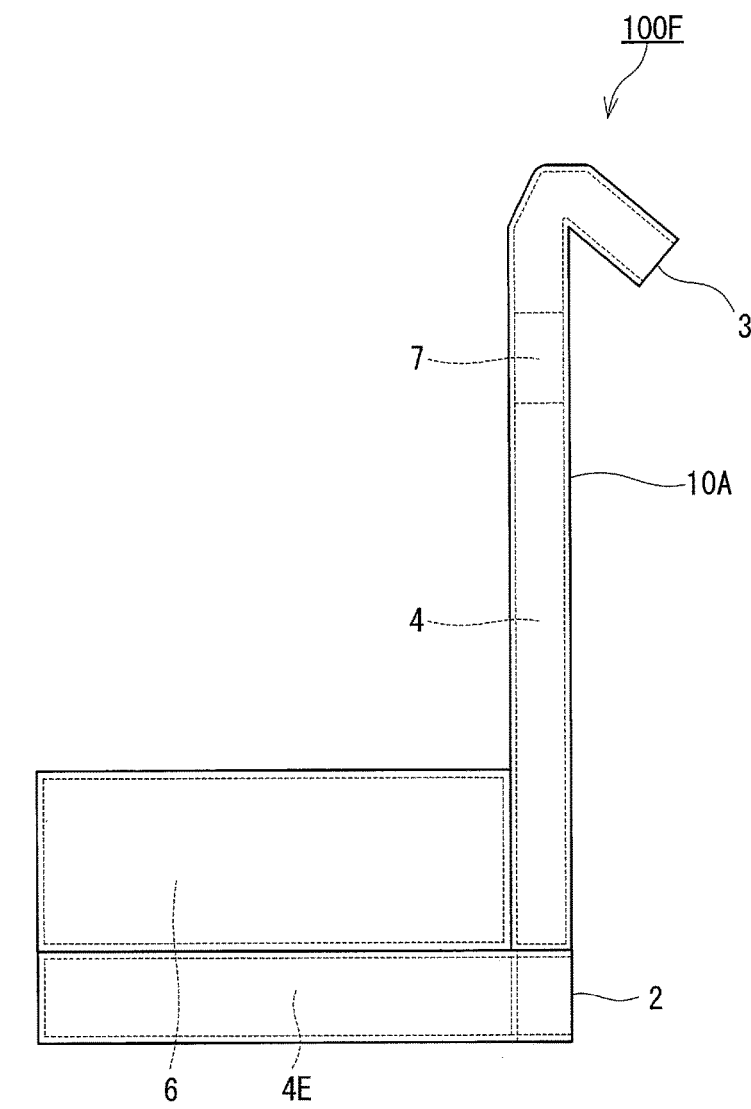
FIG. 13B is a side view of the vehicle heating apparatus shown in FIG. 13A.

The above-described embodiments can be modified in various respects. As shown in FIG. 13A and FIG. 13B, in the usage state, the fan 6 of a vehicle heating apparatus 100F may be provided behind the housing 10A. In this modification, the housing 10A has, below the fan 6, a flow path 4E formed by confining walls that restrain the drawing of air from the back and the side of the housing and from the bottom of the housing in the usage state. The intake ports 2 are formed on the right side and the left side of the flow path 4E in the usage state, and these intake ports 2 open forward. An axial-flow fan or a centrifugal fan can be used as the fan 6. Also with such a configuration, warm air blown out downwardly through the blowing port 3 can be circulated between the blowing port 3 and the intake port 2.

Figure 14:
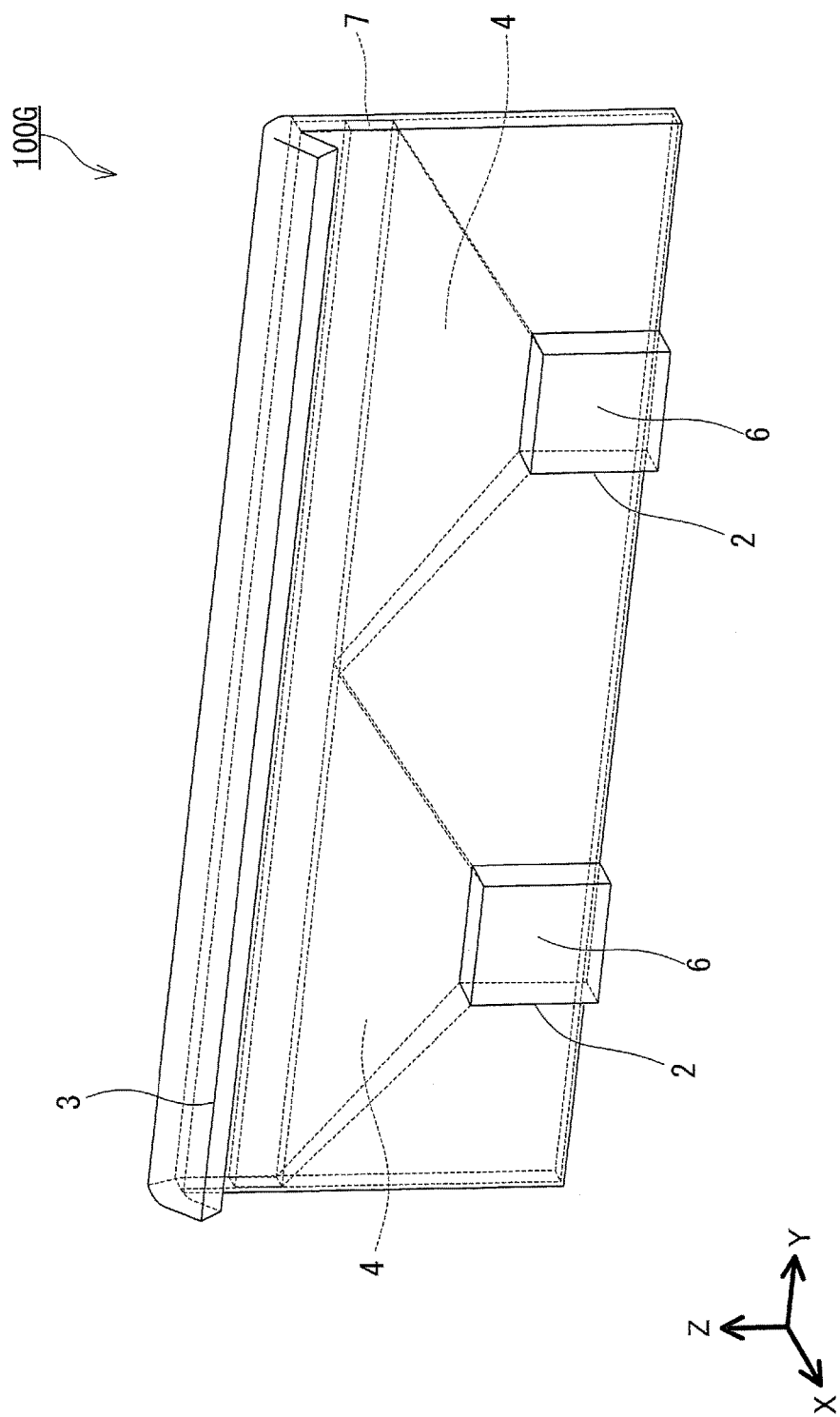
FIG. 14 is a perspective view of a vehicle heating apparatus according to another modification of the present disclosure.

As shown in FIG. 14, in a vehicle heating apparatus 100G in the usage state, the fans 6 and the intake ports 2 may be provided in front of the housing 10A. The intake ports 2 opens forward. The fans 6 are each a centrifugal fan, and more specifically is a sirocco fan. Air drawn through each intake port 2 is delivered upwardly by the fan 6. In this modification, the intake port 2 opens forward and the fan 6 is located in front of the housing 10A, and therefore warm air blown out downwardly through the blowing port 3 can be circulated easily between the blowing port 3 and the intake port 2.

Figure 15:
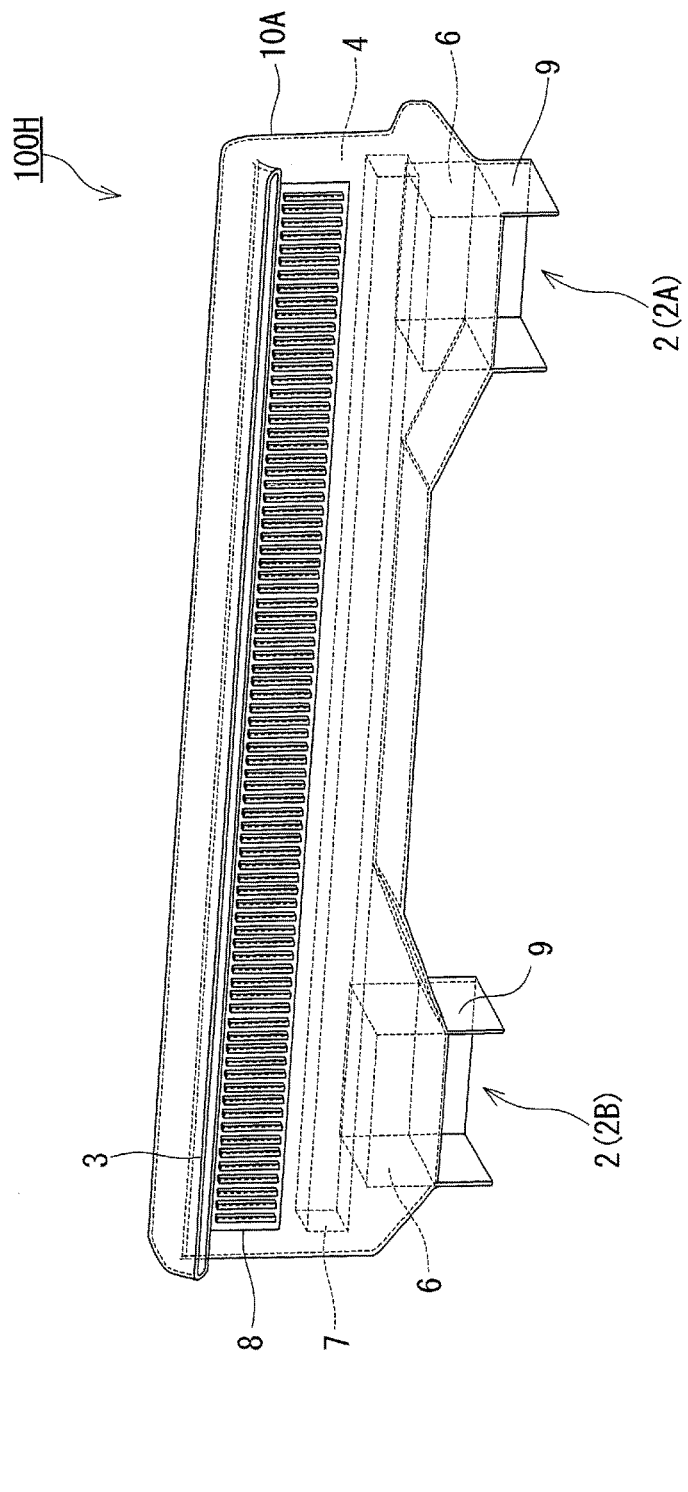
FIG. 15 is a perspective view of a vehicle heating apparatus according to still another modification of the present disclosure.

As shown in FIG. 15, a vehicle heating apparatus 100H may include a radiation member 8 on the front face of the housing 10A. The radiation member 8 exchanges heat with warm air present between the heater 7 and the blowing port 3 and radiates heat outside the apparatus. In the usage state, the radiation member 8 radiates heat in a forward direction. The radiation member 8 is a metal plate made of aluminum, iron, or the like. In order to ensure a large radiation area, projections and depressions are formed in the front face of the radiation member 8. The back face of the radiation member 8 is in contact with the housing 10A, and is thus heated by warm air present between the heater 7 and the blowing port 3. An opening of a size corresponding to the size of the radiation member 8 may be formed in the front face of the housing 10A so as to close the opening with the radiation member 8 attached thereto. In this case, the back face of the radiation member 8 forms a portion of the flow path 4. According to this modification, heat can be radiated forward by the radiation member 8, and therefore the warmth for the occupant can be increased.

In the vehicle heating apparatus 100H shown in FIG. 15, a plate-shaped electric heater (not shown) such as a PTC heater or a ceramic heater may be attached to the front face of the housing 10 in place of the radiation member 8 or in addition to the radiation member 8. Also with such a configuration, the warmth for the occupant can be increased.

Figure 16:
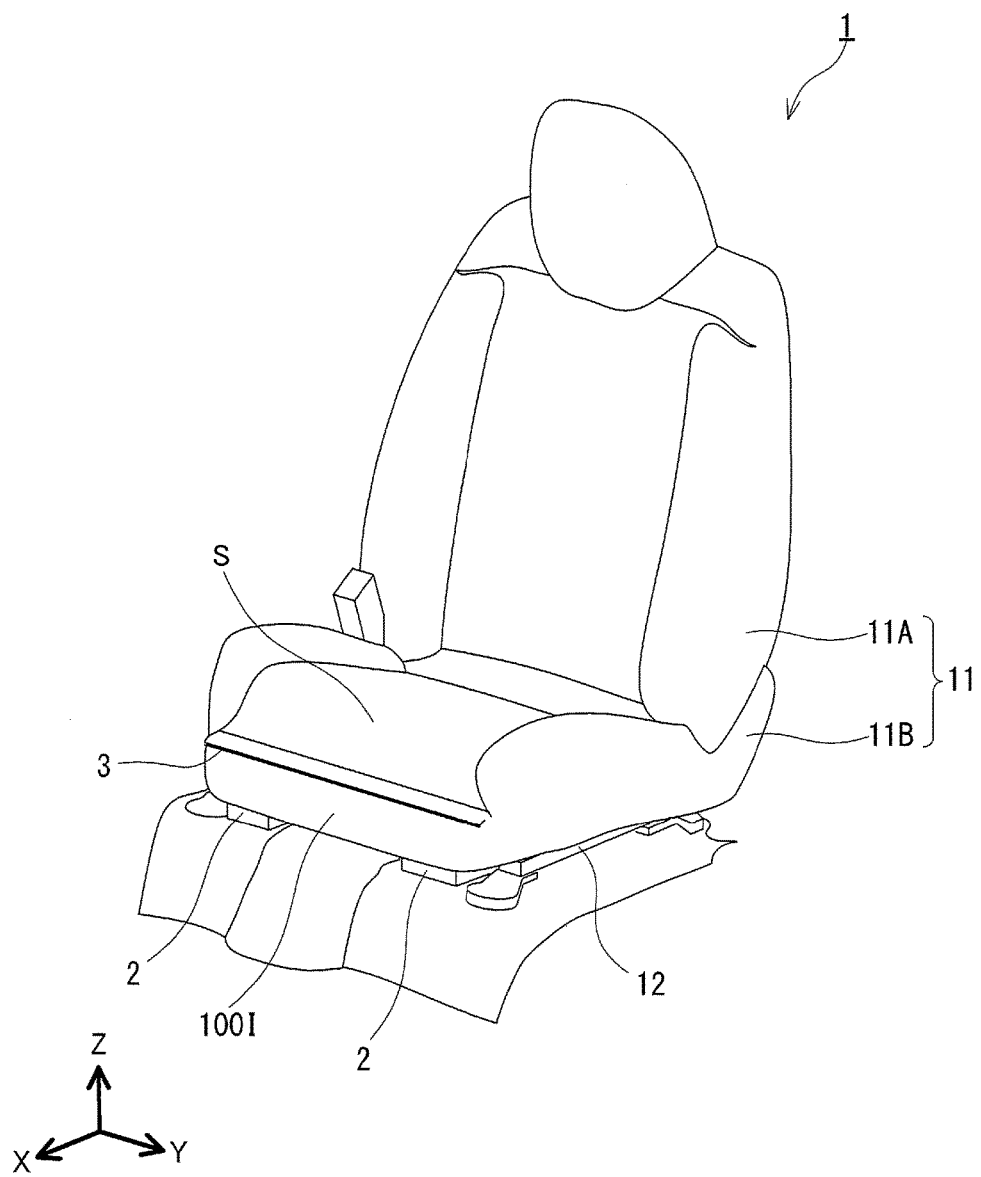
FIG. 16 is a perspective view of a heater-equipped vehicle seat according to still another modification of the present disclosure.
Figure 17:
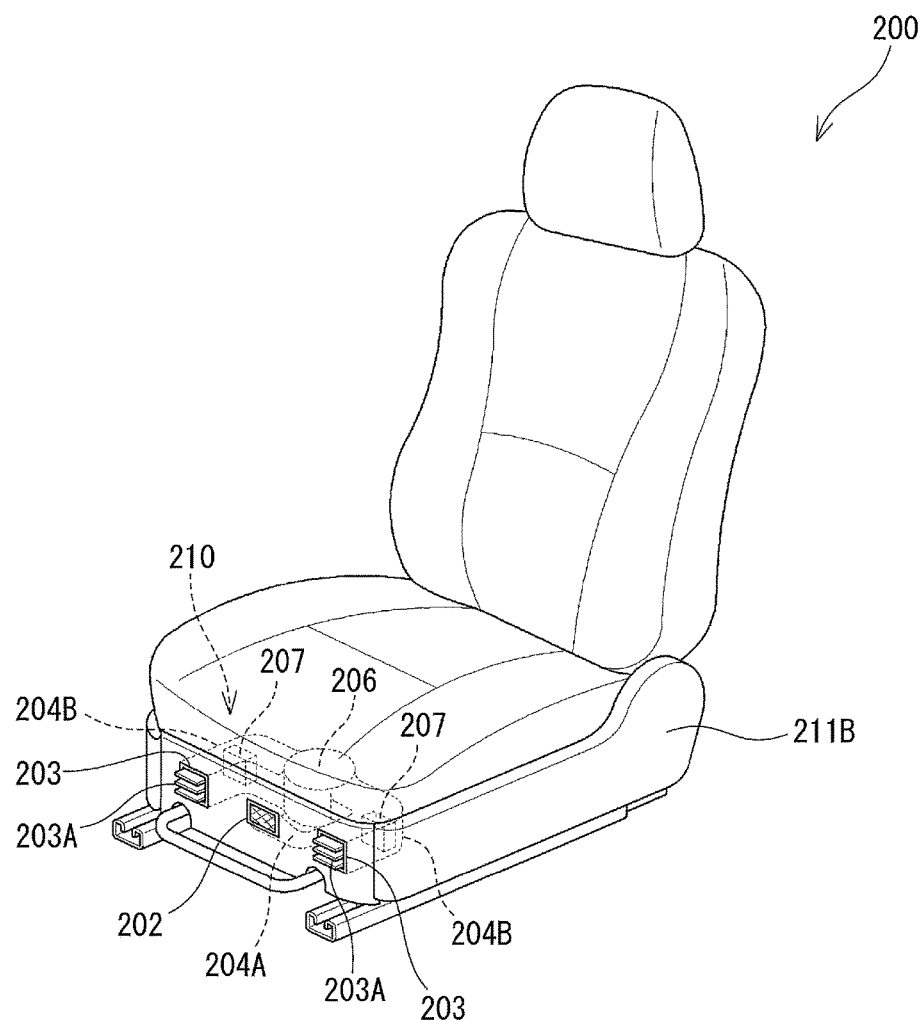
FIG. 17 is a perspective view of a conventional heater-equipped vehicle seat.
Figure 18:
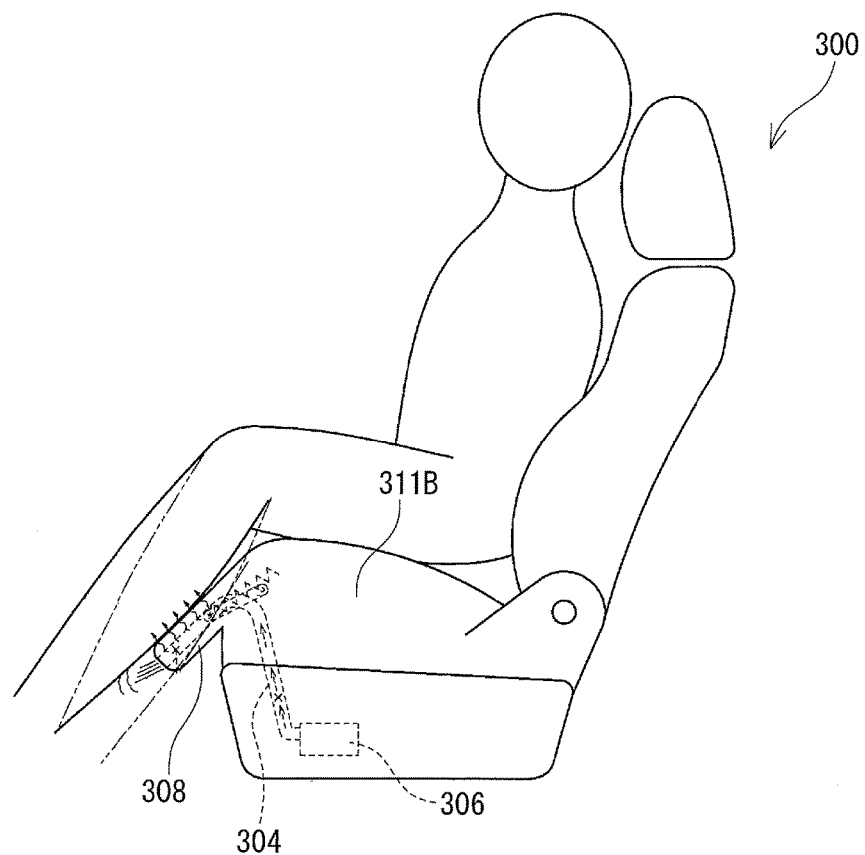
FIG. 18 is a side view of another conventional heater-equipped vehicle seat.

As shown in FIG. 16, a vehicle heating apparatuses 100I, except for the blowing port 3 and the intake ports 2, may be built in the vehicle seat 11. That is, the vehicle heating apparatus 100I may be a heating apparatus to be built in the vehicle seat 11 at a position below the sitting portion S of the vehicle seat 11. According to this modification, a larger space can be formed in front of the vehicle sheet 11. In addition, heat of air flowing in the flow path 4 is less likely to be transferred from the surface of the housing 10A, and therefore the amount of heating required for the heater 7 can be reduced.

The positions of the vehicle heating apparatuses 100A to 100I in the usage state are not limited to those of the vehicle heating apparatuses 100A to 100I placed on the horizontal XY plane in the accompanying drawings. The positions of the vehicle heating apparatuses 100A to 100I in the usage state may be those of the vehicle heating apparatuses 100A to 100I placed on the XY plane inclined at an angle of, for example, 5° or less to the horizontal plane in the accompanying drawings.

The invention may be embodied in other forms without departing from the spirit or essential characteristics thereof. The embodiments disclosed in this specification are to be considered in all respects as illustrative and not limiting. The scope of the disclosure is indicated by the appended claims rather than by the foregoing description, and all changes which come within the meaning and range of equivalency of the claims are intended to be embraced therein.

INDUSTRIAL APPLICABILITY

The vehicle heating apparatuses disclosed in the present specification can be applied to seats of vehicles such as automobiles, electric trains, airplanes, and ships.

What is claimed is:

1. An apparatus, comprising:
 a housing having an intake port, a blowing port, and an internal space serving as a flow path of air from the intake port to the blowing port;
 a fan provided in the internal space of the housing; and
 a heater provided in the internal space of the housing, wherein
 in a usage state where the apparatus is mounted on or built in a seat, the blowing port is located above the intake port and opens downwardly with respect to a horizontal direction,
 the blowing port is formed in such a manner that a normal line to an opening face of the blowing port is inclined downwardly at an angle of more than 0° and less than 90° to a horizontal plane in the usage state, and
 a width of the blowing port is greater than a width of the intake port.

2. The apparatus according to claim 1, wherein further comprising a sitting portion for supporting an occupant's upper legs, and the intake port and blowing port both open in at least one of a forward and downward direction below the sitting portion in the usage state.

3. The apparatus according to claim 1, wherein when the apparatus in the usage state is viewed in plan from a front of the seat, the blowing port and the intake port overlap each other in a width direction.

4. The apparatus according to claim 1, wherein when the apparatus in the usage state is viewed in plan from a front of the seat, the intake port is located entirely within the width of the blowing port in a width direction.

5. The apparatus according to claim 1, wherein a ratio of the width of the blowing port to the width of the intake port is in a range of 1.2 to 10.

* * * * *